March 6, 1956  A. M. SENKEWICH ET AL  2,737,255
IMPACT STEERING SAFETY DEVICE FOR VEHICLES
Filed Oct. 11, 1954
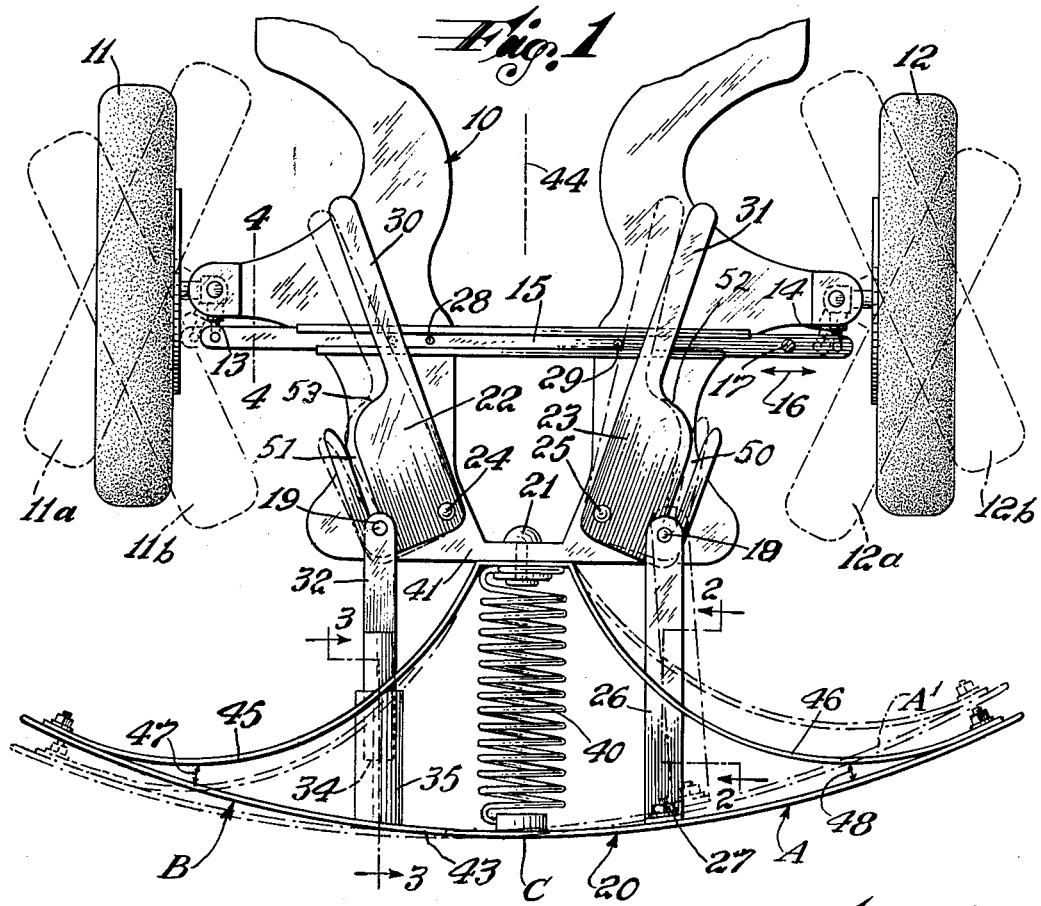
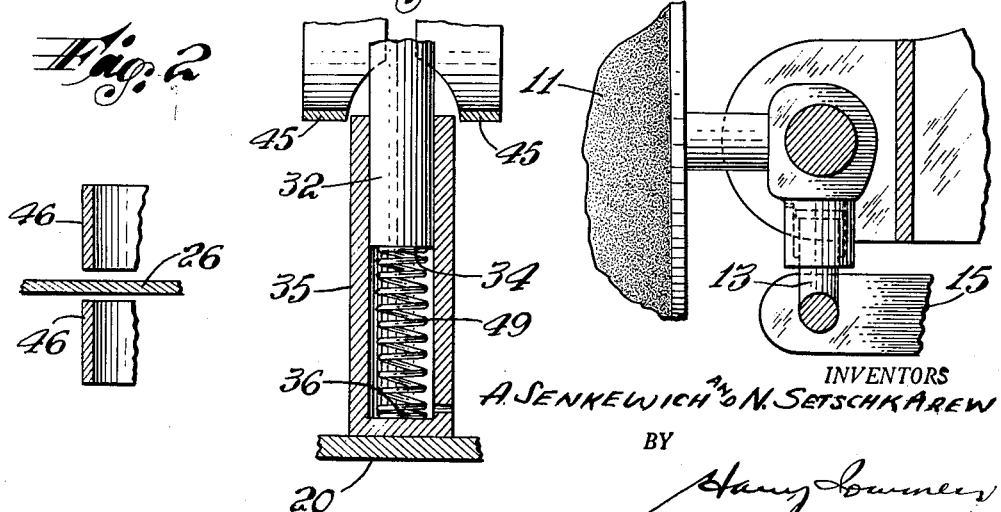
INVENTORS
A. SENKEWICH AND N. SETSCHKAREW
BY
Harry Lowney
ATTORNEY United States Patent Office 2,737,255
Patented Mar. 6, 1956

2,737,255
IMPACT STEERING SAFETY DEVICE FOR VEHICLES

Alexander M. Senkewich, Wallington, and Nikolai K. Setschkarew, Trenton, N. J.

Application October 11, 1954, Serial No. 461,446

8 Claims. (Cl. 180—83)

This invention relates to a device for use in connection with a steering bar of a vehicle for directing the vehicle away from a point of impact by translating the stress and strain imposed on a frame at the front end of the vehicle to move the steering bar to automatically steer the vehicle away from said point of impact. The drawings illustrate a practical form of the invention; it will be understood that the invention may be embodied in other forms coming within the scope of purview of the appended claims.

These and other advantageous objects, which will appear from the drawings and from the description hereinafter, are accomplished by the structure of my invention, of which an embodiment is illustrated in the drawings. It will be apparent, from a consideration of said drawings and the following description, that the invention may be embodied in other forms suggested thereby, and such other forms as come within the scope of the appended claims are to be considered within the scope and purview of the instant invention.

In the drawing:

Fig. 1 is a top plan, fragmentary view of the front end of a vehicle provided with a device embodying the invention, Fig. 2 is an enlarged vertical, sectional view taken on line 2—2 of Fig. 1, Fig. 3 is an enlarged horizontal sectional view taken on line 3—3 of Fig. 1, and Fig. 4 is an enlarged horizontal sectional view taken on line 4—4 of Fig. 1.

As shown in the drawings, the device of this invention is adapted for use in connection with a vehicle 10 (Fig. 1) which may, for example, be an automobile, the steering wheels 11 and 12 of which are connected by suitable linkages 13 and 14 to the steering bar 15 which is so mounted on the vehicle as to have reciprocatory movement, as indicated by the arrow 16 through the conventional steering mechanism, schematically illustrated in Fig. 1 by the reference character 17 connected to said steering bar. Pursuant to the present invention, means are provided to automatically steer the vehicle away from a point of impact directed toward a front end of the vehicle without in any wise interfering with the usual steering mechanism 17.

Said means comprise preferably a frame 20 secured to the front end of the vehicle as at 21, and a pair of arms 22, 23 pivotally connected to the front end of the vehicle, preferably as indicated at 24, 25, in spaced relation. A link 26 is connected at one end 27, preferably directly with the frame 20, and at the other end, as by means of a pin 18 passing freely through a slot 50 in the arm 23, indirectly to said arm. The steering bar 15 is provided with means such as upstanding fingers 28, 29 adapted to be engaged by the free ends 30, 31 of the arms 22, 23 as below more fully described. A second link 32 is provided having said indirect connection at 19 with the arm 22 at one end and having a lost motion connection at the other, free end 34 thereof with a member 35 fixed to the frame 20. Said lost motion connection of the link 32 with the member 35 is attained by proportioning the link as for example, illustrated in Fig. 1 of the drawings, to normally extend only partially into the open member 35 and short of the closed end 36 of the member 35 on the frame 20, a return spring 49 being interposed as shown in Fig. 3.

When an impact force is applied to the member 20 (at the point A, Fig. 1 for example) member 20 will flex to the dotted line position A' responsive to movement of the link 26 into engagement with the arm 23, rotating said arm to move to interengagement with the finger 29 of the bar 15, moving said bar so as to effect the turning of the wheels in the direction indicated by the dotted lines 11a and 12a. The other arm 22, will pivot to the dotted line position shown without translating any force as pin 19 will freely ride in slot 51 on contact of pin 28 with arm 22. Thus the vehicle is automatically steered away from the point of impact without any action on the part of the driver. Conversely, when an impact force is applied at a force point B to the bar 20, said bar will flex and end 36 of member 35 will fully compress spring 49 against the free end 34 of the second link 32 so that said link will rotate arm 22 against the finger 28 on the steering bar 15 (dotted line position not shown) rotating the wheels to dotted line position 11b, 12b, to steer the vehicle away from the point of impact. Since the link 26 is directly connected with the frame 20 while the second link 32 is indirectly connected thereto, a force applied approximately centrally of the frame, link 26 offering a direct move first to the dotted line position, with the result that there would not be any tendency of the links 32, 26 to operate against each other responsive to an impact force applied approximately centrally of the frame (at C). A yieldable member such as a spring 40 is fixed at opposite ends to the frame 20 and to the front end 41 of the vehicle so as to normally maintain the frame in the position shown in the full lines in the drawings and to return the same to that position upon return of the frame to normal position following impact. The frame 20 preferably comprises a major elongated portion 43 disposed substantially at right angles to the longitudinal axis 44 of the vehicle and minor leg members 45, 46 extending from the ends of the major portion 43 at an acute angle thereto, as indicated at 47, 48 and connected to the front end 41 of the vehicle as shown in Fig. 1.

As the free ends 30, 31 of arms 22, 23 are normally spaced from the fingers 28, 29 on steering bar 15, the arms 22, 23 will not normally interfere with steering of the vehicle.

Slots 50, 51 in arms 22, 23 preferably open toward the free ends of said arms 31, 30 so that pins 18, 19 may pass beyond the ends of the slots and would then be guided thereinto by the curved sections 52, 53 of the arms adjacent the open ends of the slots.

Having thus described my invention, what I claim as new and desire to secure by Letters Patent is:

1. A device for use in connection with the steering bar of a vehicle, for directing the vehicle away from a point of impact comprising an impact frame adapted to be medially fixed to the front end of the vehicle, a pair of arms pivotally connected to said front end in laterally spaced relation, a link connected at one end to said frame at one side of the vehicle axis and at the other end to one of said arms, a second link connected at one end at the opposite side of said axis to the other of said arms and a member connected to the frame and having a lost-motion connection with said link at the other end thereof, so that on movement of said frame on impact toward the front end of the vehicle, at the point of connection of the member therewith said member will not engage the second link until it has moved sufficiently to take up said lost motion connection, said arms having free ends, and means on the steering bar to be engaged by said free ends on movement of the arms responsive to impact movement of the frame, to translate said movement into steering of the vehicle away from the point of impact of the frame.

2. In a device as set forth in claim 1, a yieldable member fixed at opposite ends to the center of said frame and to the front end of the vehicle to absorb the shock of impacts directed medially of the frame, and to return the frame to normal position on discontinuance of the impact stress.

3. In a device as set forth in claim 1, said frame comprising an elongated flexible bar and a pair of shorter bars connected to the elongated bar and to the front end of the vehicle at opposite sides of said axis, said links being so connected to the elongated bar.

4. In a device as set forth in claim 1, said links being connected to said arms by lost-motion connections.

5. In a device as set forth in claim 1, said member connected to the frame being a tubular member and said second link having said lost-motion connection therewith by proportioning the link to normally extend only partially into said tubular member and short of the end of the tubular member on the frame so that said member connected to the frame will have driving contact with the second link only when the frame has flexed sufficiently to move the member connected to the frame a distance sufficient to take up the normal spacing of the link from the end of the tubular member on the frame.

6. In a device as set forth in claim 1, said frame being flexible and comprising a major elongated portion disposed substantially at right angles to the longitudinal axis of the vehicle and minor leg members extending from the ends thereof at acute angles thereto and connected to the front end of the vehicle at opposite sides of said axis.

7. In a device as set forth in claim 1, said links being so connected to the arms by pins on said links and slots provided on the arms to receive the pins.

8. In a device as set forth in claim 7, said slots opening toward the free ends of the arms, said arms having curved sections adjacent the open ends of the slots.

References Cited in the file of this patent

UNITED STATES PATENTS

| | | |
|---|---|---|
| 1,251,639 | Chadwick | Jan. 1, 1918 |
| 1,472,345 | Weigel | Oct. 30, 1923 |
| 1,936,054 | Harzbecker | Nov. 21, 1933 |
| 2,159,651 | Brockett | May 23, 1939 |